United States Patent Office 3,081,325
Patented Mar. 12, 1963

3,081,325
TRIALKYLLEAD THIOGLYCOLAMIDES
Peter Ballinger, San Rafael, Calif., assignor to California Research Corporation, San Francisco, Calif., a corporation of Delaware
No Drawing. Filed June 29, 1961, Ser. No. 120,492
6 Claims. (Cl. 260—437)

This invention relates to a novel organolead compound. More particularly, the invention is concerned with trialkyllead thioglycolamide.

Organolead compounds of the present type are useful in many compositions. They are employed as antidetonants in gasoline compositions for modern spark ignition internal combustion engines. They are also employed in the preparation of pesticides and fungicides.

The trialkyllead thioglycolamide of this invention has the general formula

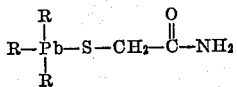

in which the R's are lower alkyl groups preferably containing from 1 to 4 carbon atoms and mixtures thereof. Illustrative alkyl groups include methyl, ethyl, n-propyl, isopropyl, n-butyl, isobutyl, hexyl n-heptyl and the like.

The following examples illustrate the preparation and characteristics of the trialkyllead thioglycolamide of this invention. Unless otherwise specified the proportions are on a weight basis.

EXAMPLE I

Thioglycolamide is prepared by passing ammonia through 33 g. of methyl thioglycolate until the heat of reaction ceases to be evolved. The viscous liquid is placed in a vacuum desiccator under a pressure of 1 mm. of mercury. Twenty-five grams of a white solid remains which amounts to a yield of 88%.

Ten grams of the above amide is dissolved in water and then added to a solution of 30 g. of trimethyllead chloride in water. A solution of sodium carbonate is added, and after standing gray crystals separate which are dried. The yield is 7.2 g. This material is subjected to analysis with the following results: percent C, 18.0; percent H, 3.9; percent N, 4.0; percent Pb, 53.9. Theoretical values for $C_5H_{13}ONSPb$ are C, 17.6; H, 3.8; N, 4.1; and Pb, 60.3.

The following table lists additional examples of trialkyllead thioglycolamides which are prepared from the corresponding trialkyllead halides according to the process as outlined above.

Table

| Examples No.: | Compound |
|---|---|
| II | Triethyllead thioglycolamide. |
| III | Ethyldimethyllead thioglycolamide. |
| IV | Isopropyldiethyllead thioglycolamide. |
| V | Tributyllead thioglycolamide. |
| VI | n-Heptyldimethyllead thioglycolamide. |

This application is a continuation-in-part of Peter Ballinger U.S. application Serial No. 78,268 filed December 27, 1960, which is now abandoned.

I claim:
1. Trialkyllead thioglycolamides in which the alkyl groups contain from 1 to 7 carbon atoms.
2. Trimethyllead thioglycolamide.
3. Triethyllead thioglycolamide.
4. Ethyldimethyllead thioglycolamide.
5. Isopropyldiethyllead thioglycolamide.
6. Tributyllead thioglycolamide.

No references cited.